United States Patent
Mahbobi

(10) Patent No.: US 7,079,722 B2
(45) Date of Patent: Jul. 18, 2006

(54) APPARATUS AND METHOD FOR TRANSMITTING ELECTRICAL POWER THROUGH A TRANSPARENT OR SUBSTANTIALLY TRANSPARENT MEDIUM

(75) Inventor: Kamran Mahbobi, Closter, NJ (US)

(73) Assignee: Maxentric Technologies LLC, Fort Lee, NJ (US)

( * ) Notice: Subject to any disclaimer, the term of this patent is extended or adjusted under 35 U.S.C. 154(b) by 0 days.

(21) Appl. No.: 10/947,521

(22) Filed: Sep. 22, 2004

(65) Prior Publication Data

US 2006/0062515 A1   Mar. 23, 2006

(51) Int. Cl.
*G02B 6/12* (2006.01)

(52) U.S. Cl. .................. 385/14; 385/2; 385/8; 385/24; 385/40; 385/50

(58) Field of Classification Search .............. 385/2, 385/8, 14, 24, 40, 50, 7
See application file for complete search history.

(56) References Cited

U.S. PATENT DOCUMENTS

| | | | |
|---|---|---|---|
| 4,109,214 A | 8/1978 | Main | |
| 4,109,251 A | 8/1978 | MacDougall | |
| 4,238,199 A | 12/1980 | Rothbuhr et al. | |
| 4,238,799 A | 12/1980 | Parfitt | |
| 4,266,227 A | 5/1981 | Blaese | |
| 4,621,243 A | 11/1986 | Harada | |
| 4,692,770 A | 9/1987 | Kadokura | |
| 4,764,773 A | 8/1988 | Larsen et al. | |
| 4,779,098 A | 10/1988 | Blaese | |
| 4,794,319 A | 12/1988 | Shimazaki | |
| 4,825,217 A | 4/1989 | Choi | |
| 4,857,727 A * | 8/1989 | Lenz et al. | 398/168 |
| 4,882,592 A | 11/1989 | Studer, Jr. et al. | |
| 4,916,456 A | 4/1990 | Shyu | |
| 5,057,847 A | 10/1991 | Vaisanen | |
| RE33,743 E | 11/1991 | Blaese | |
| 5,099,251 A | 3/1992 | Fisher | |
| 5,105,201 A | 4/1992 | Nakase et al. | |
| 5,134,486 A | 7/1992 | Suzuki et al. | |
| 5,161,255 A | 11/1992 | Tsuchiya | |
| 5,212,492 A | 5/1993 | Jesman et al. | |
| 5,278,572 A | 1/1994 | Harada et al. | |
| 5,283,589 A | 2/1994 | Blevins | |
| 5,298,907 A | 3/1994 | Klein | |
| 5,357,262 A | 10/1994 | Blaese | |
| 5,422,681 A | 6/1995 | Hayashi | |
| 5,436,553 A * | 7/1995 | Pepper et al. | 323/259 |
| 5,451,966 A | 9/1995 | Du et al. | |
| 5,528,409 A * | 6/1996 | Cucci et al. | 398/15 |
| 5,557,290 A | 9/1996 | Watanabe | |
| 5,734,355 A | 3/1998 | Watanabe | |
| 5,835,646 A * | 11/1998 | Yoshimura et al. | 385/14 |

(Continued)

FOREIGN PATENT DOCUMENTS

JP    6260815    9/1994

(Continued)

*Primary Examiner*—John D. Lee
*Assistant Examiner*—Rhonda S. Peace
(74) *Attorney, Agent, or Firm*—Klauber & Jackson LLC

(57) ABSTRACT

An apparatus and method is provided which allows transfer of DC electrical power across a transparent or semitransparent medium such as glass. Electrical power transfer is achieved using a suitable optical source (matched visible light or infrared LED or LD arrays are best suited) that illuminates a matched solar cell array on the other side of the medium.

3 Claims, 7 Drawing Sheets

U.S. PATENT DOCUMENTS

| | | |
|---|---|---|
| 5,850,199 A | 12/1998 | Wan et al. |
| 5,872,549 A | 2/1999 | Huynh et al. |
| 5,898,407 A | 4/1999 | Paulus et al. |
| 5,898,408 A | 4/1999 | Du |
| 5,929,718 A | 7/1999 | Crosby |
| 6,069,588 A | 5/2000 | O'Neill, Jr. |
| 6,097,345 A | 8/2000 | Walton |
| 6,140,966 A | 10/2000 | Pankinaho |
| 6,232,926 B1 | 5/2001 | Nguyen et al. |
| 6,686,882 B1 | 2/2004 | Petros et al. |
| 6,707,274 B1 * | 3/2004 | Karr ............................ 320/107 |
| 6,718,079 B1 * | 4/2004 | Gidon ........................ 385/14 |
| 6,859,571 B1 * | 2/2005 | Kimerling ................... 385/14 |
| 2002/0041728 A1 * | 4/2002 | Yamashita et al. ............ 385/24 |
| 2005/0151876 A1 * | 7/2005 | Karr ............................ 348/373 |
| 2005/0152631 A1 * | 7/2005 | Labbe et al. .................. 385/1 |

FOREIGN PATENT DOCUMENTS

JP         2004274074 A  *  9/2004

\* cited by examiner

Functional Block Diagram

3 Dimensional Set Up

Circuit Diagram for IR LED Array

Solar Array Arranged in Parallel Configuration $V_{total} = V_{ind}$
$I_{total} = N * I_{ind}$ Solar Array Arranged in Serial Configuration $V_{total} = N * V_{ind}$
$I_{total} = I_{ind}$ A Dual Voltage Array with a +3V Supply at 20mA and a -0.5V Supply at 1 mA $V_1 = 3V$
$I_1 = 20$ mA $V_2 = 0.5V$
$I_2 = 1$ mA Three Dimensional View of an Active Through Glass Antenna with Alignment Feedback Block Diagram of Satellite TV Cabling Through Glass Windows Three Dimensional View of an Active Through Glass Coupler

APPARATUS AND METHOD FOR TRANSMITTING ELECTRICAL POWER THROUGH A TRANSPARENT OR SUBSTANTIALLY TRANSPARENT MEDIUM

BACKGROUND OF THE INVENTION

The present invention relates generally to transmission of DC electrical power through a transparent or substantially transparent medium such as glass. More particularly, this invention relates to an interface for the transmission of power for electronic systems through substantially transparent media such as glass. Applications involving substantially transparent media might involve power transfer through sealed glass chambers (such as in laboratory or industrial type vacuum applications) or power transfer through glass windows (such as in applications involving vehicles or standing structures where there is a need to drive power from inside through glass to antennae, intrusion detection sensors, etc.). In such applications, there is a need to avoid drilling or creating a hole through the glass when providing the power transfer and/or needed signals. Some prior art systems attempt to provide trans-glass signals and/or power for applications such as mobile telephone antennas or home satellite TV systems, but electrical power transfer for these applications is accomplished by use of a magnetic coupling. Magnetic couplings require that DC current be converted to an AC current that can excite a coil on one side of the medium, such that the current is then induced in a second coil on the other side of medium, and thereafter converted to DC current. However, these types of approaches do not provide for a versatile trans-glass power interface that provides for all manner of applications, such as mobile phone antennae, satellite or other video reception modalities, intrusion detection/security systems, or vehicular satellite radio systems. Moreover, the magnetic couplings themselves are cumbersome because the standard DC power utilized in such applications must be converted to AC power in order to effect power transfer in magnetic coupling. Additionally, the coils utilized in magnetic couplings must be aligned across the glass from each other in order to make the system function properly, something which is both time consuming and difficult to achieve when installing the interface. Power transfer through the use of magnetic coupling also requires the use of magnetic toroids that are typically circular in shape. This requirement constraints the shape of any magnetically coupled power transfer apparatus such that a suitable toroid can be accommodated. Lastly, there is a further problem associated with magnetic couplings because, in certain applications involving exposure to nearby electromagnetic interference (EMI), such as AM/FM broadcast signals from nearby receiving antennas, defrosting elements on car windows, etc., magnetic coupling could interfere with operation with other systems such as AM/FM radios. Therefore, there is a need in the art for an interference resistant system that is versatile in terms of usage in diverse application, yet more easily installed within different electronic systems.

SUMMARY OF THE INVENTION

Many electronics applications require the transfer of electrical power across an electrically isolated and optically transparent medium such as glass without the use of electrical wires that require holes through the transparent medium. The present invention provides a system that overcomes the deficiencies of prior art techniques for transmitting electrical signals through glass barriers in electronic circuits. Accordingly, the present invention provides an interference-resistant, versatile interface for transmitting electrical power between a first transmission line emanating from electronic circuitry that is connected to a conversion module on a first side of a substantially transparent medium (such as glass or other substantially transparent media), and a second transmission line that is connected to electronic circuitry on a second side of the substantially transparent medium. In direct contrast to the prior art of magnetic coupling systems, the present invention accomplishes power transfer by using optical coupling in place of the magnetic couplings seen in prior art devices. Unlike magnetic coupling mechanisms, there is no need for any DC to AC conversion on one side of the medium, and conversely, there is no need for a corresponding AC to DC conversion on the other side of the medium. DC electrical power is converted to optical power using any suitable source such as incandescent lights or fluorescent lights, lasers, laser diodes (LDs) or light emitting diodes (LEDs). The optical sources are arranged in an array to provide enough elimination for the receiving surface area. This optical power is passed through the transparent medium, and illuminates an array of solar cells which function as the receiving surface area on the other side of the medium. The array of solar cells converts the optical power to an equivalent DC current and voltage, the net result being the transfer of electrical power through the medium. Unlike magnetic coupling mechanisms, the shape of the power transfer interface is not dictated by the shape of its magnetic coil or toroid. The present invention could take any shape, including long narrow strips. Moreover, in direct contrast to the prior art magnetic coupling systems, the power transfer surface in the present invention does not need to be contiguous, such that, several small surface area might even be utilized to achieve power transfer.

DETAILED DESCRIPTION

Figure 1:
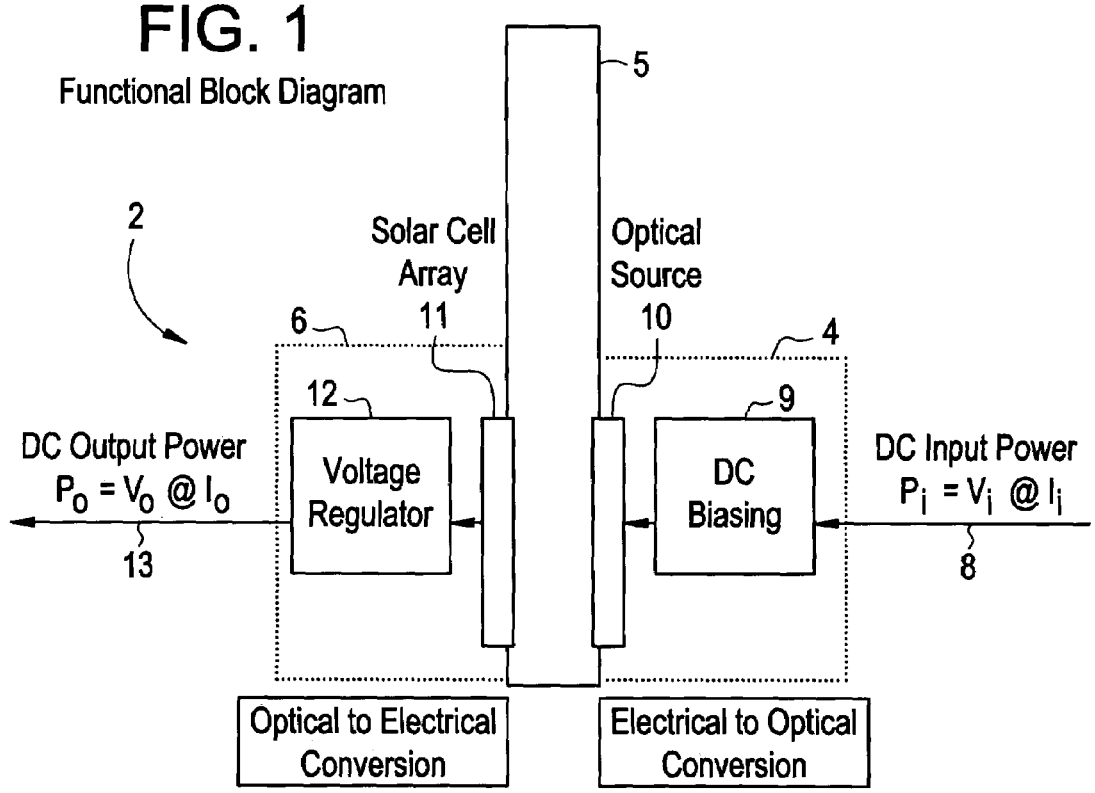
FIG. 1 is a generalized block diagram of the invention.
Figure 2:
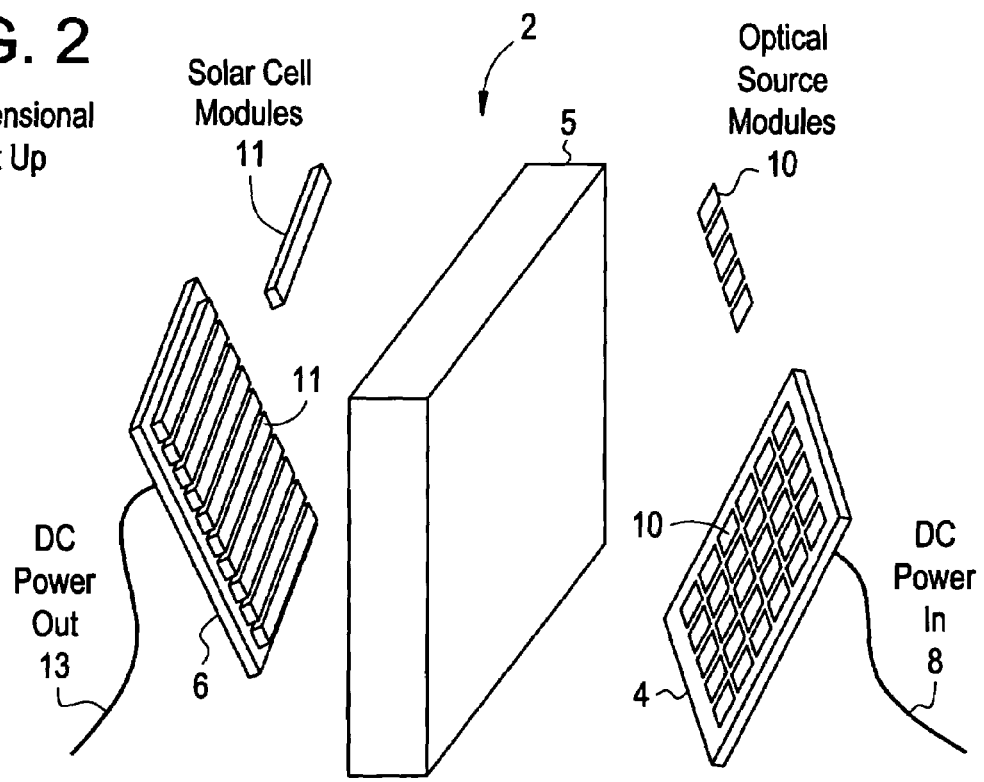
FIG. 2 is an offset view of the transfer interface according to the invention for transmitting electrical power to an exterior transmission line, further detailing an exemplary patterning of the optical source and the receiving source.

FIGS. 1 and 2 depict respectively, a functional block diagram, and 3-D offset exploded view of the inventive interface. With ongoing reference to FIGS. 1 and 2, the inventive interface circuit 2 connects across a substantially transparent medium 5 (e.g., a dielectric such as glass), a first transmission line 8 delivering DC power from a first electronic circuit (not depicted) on a first side of the substantially transparent medium 5, and a second transmission line 13 that is connected to a second electronic circuit (not depicted) on a second side of the substantially transparent medium 5. In one embodiment, the interface 2 comprises an electrical to optical conversion module 4 at the first side for converting an electrical input received along the transmission line 8 from the first electronic circuit to an optical output. The electrical to optical conversion module 4 preferably includes a DC biasing unit 9 for inputting the DC input power into the optical source 10. The optical source 10 may be fabricated from several different optical sources, such as LEDs, LDs, lasers, infrared (IR) emitters, fluorescent or incandescent light sources (with the appropriate drivers), etc., as known in the art of emitting various forms of optical energy, and depending on specific needs such as cost, performance, size, etc. Selection of the particular wavelength to be utilized by the optical source is thereafter driven by the characteristic of the solar cell, as well as the transmission characteristic of the substantially transparent medium. As one skilled in the art will appreciate, the selection of the optical source also depends on the particulars regarding the end use or application of the interface, whether used on car, home or building windows, or in laboratory vacuum applications, etc.

Accordingly, the present invention contemplates all of the above variants as possible embodiments therein, however, depending on the target application, several key factors such as a desired power transfer efficiency, size, and cost may determine different embodiments. With regard to cost, sources with high electrical to optical efficiencies (such as lasers or LDs) are typically more expensive than more traditional optical sources such as incandescent or fluorescent lights. To this end, for less expensive applications one alternative embodiment might utilize incandescent and fluorescent light sources, despite the trade offs therein, in terms of the limited wavelength options and the relatively low electrical to optical conversion efficiency.

Given that the efficiency of the electrical to optical conversion further depends upon the optical wavelength used, a particularly efficient embodiment might utilize infrared or monochrome (e.g., single or narrowband wavelength) optical sources, rather than multi color optical sources which are not especially efficient for converting electrical power to optical power. To this end, in one embodiment, where cost is less of a concern than high power transfer efficiency, traditional lasers or semiconductor based laser diodes (LDs) would offer the highest optical power density, and hence the best electrical to optical conversion efficiencies of all possible optical sources, particularly given the variety of wavelengths such as IR available therein.

By way of illustration in one exemplary application of the inventive interface, automobile satellite radio systems, might preferably utilize LEDs as an optical source within the inventive interface, given their versatility and the above detailed trade off between power conversion efficiency, size, and cost of other optical sources. However, specialized LEDs (such as GaAs LEDs) might be favorably utilized because of their small size, variety of wavelengths (IR to UV), ease of array configuration, reliability, and efficiency.

Figure 3:
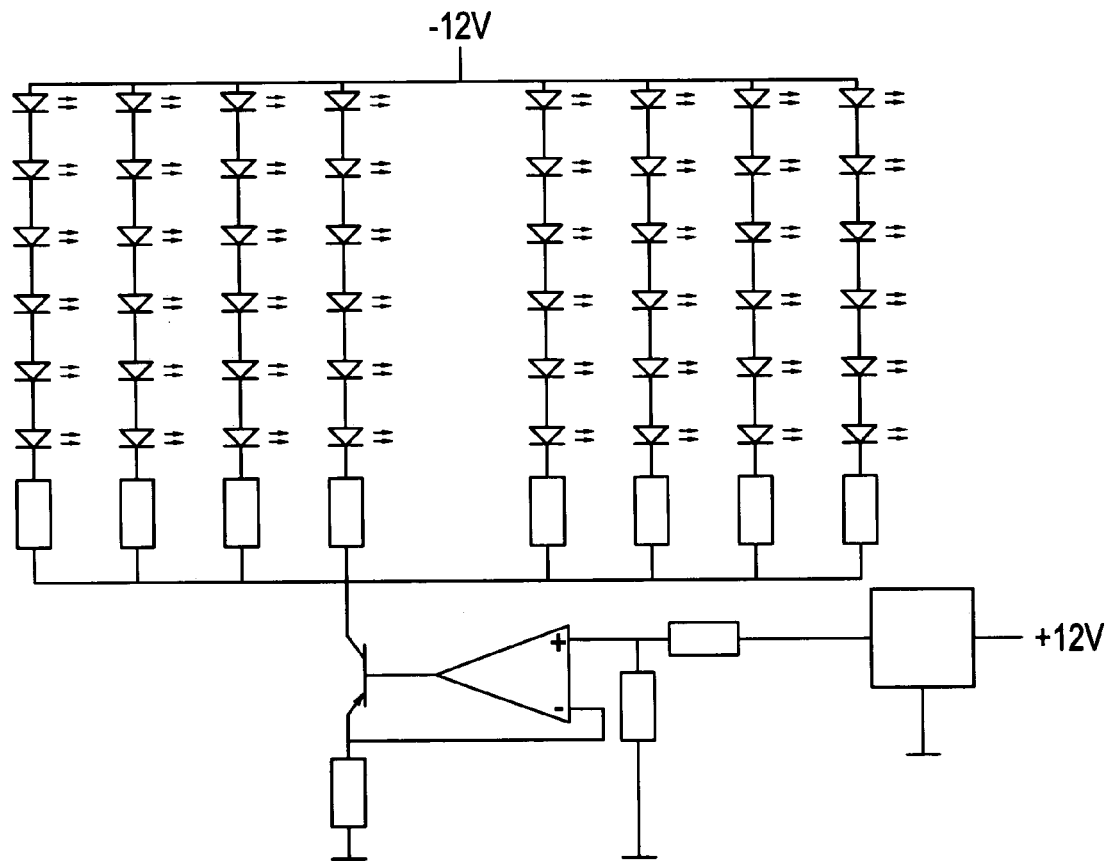
FIG. 3 is a schematic diagram of circuitry according to the invention for an exemplary optical source, such as an IR LED array.

FIG. 3 depicts a typical circuit configuration for an exemplary IR LED array used on one side of a substantially transparent medium. The optical output of this embodiment is transmitted from the preferred optical source across the substantially transparent medium 5 from the first side of the substantially transparent medium 5 to the optical to electrical conversion module 6 at the second side of the substantially transparent medium 5. The optical to electrical conversion module 6 comprises a solar cell array 11 for receiving the optical output. The solar cell array comprises an array of individual solar cells that, when illuminated by an optical source, produce a voltage and a current based the photovoltaic effect, thereby converting the optical power to electrical power.

Figure 4:
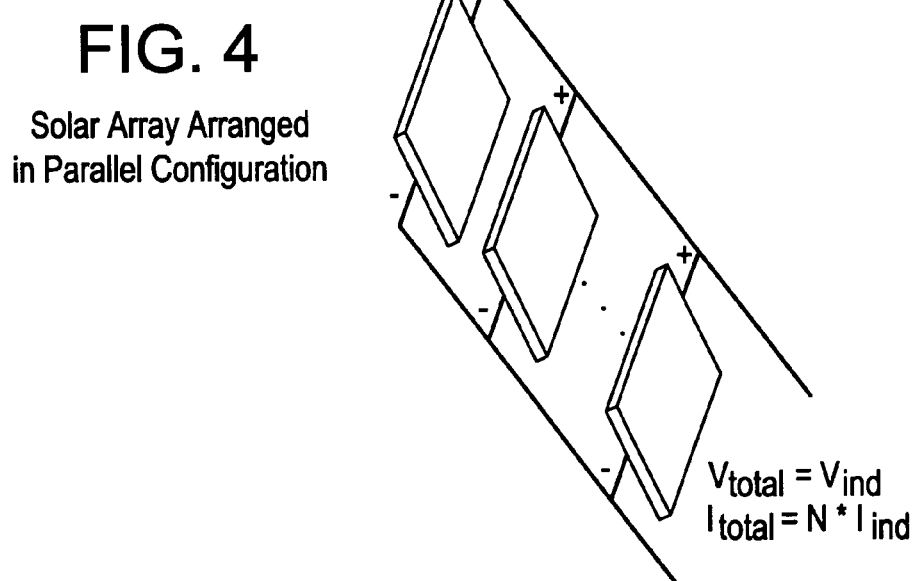
FIG. 4 graphically illustrates an exemplary receiving surface, such as a solar cell array arranged in parallel configuration.
Figure 5:
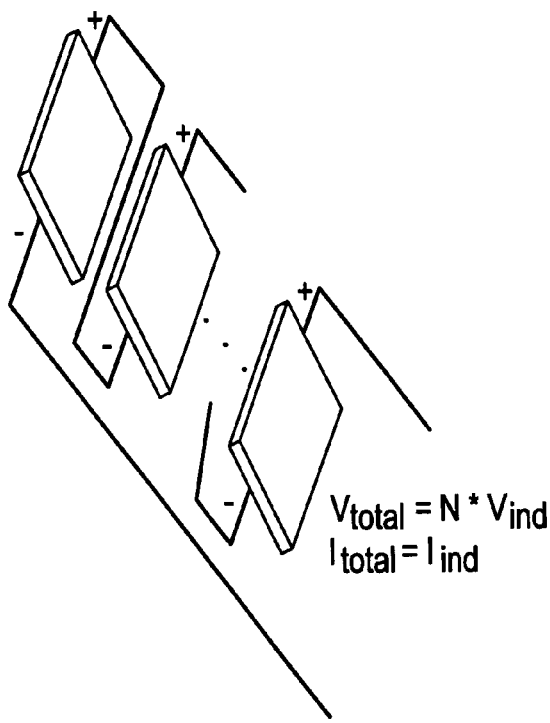
FIG. 5 graphically illustrates an exemplary receiving surface, such as a solar array arranged in serial configuration.

After an appropriate optical source is thusly selected to fit the application utilizing the described interface, the particular solar cell array 11 will be ideally matched so as to optionally cooperate with the chosen optical source. Commercially available solar cells come in a variety of sizes and efficiencies. The selection of a specific solar cell or solar cell technology depends on the desired conversion efficiency, size and cost constraints. Typically, a solar cell can deliver a fixed voltage (typically between 0.5V to 0.6V) and a variable current that is proportional to the surface area of the cell and optical illumination density. Solar cells are often characterized by their open circuit voltage and closed circuit current capability. Larger surface areas result in larger current generation capability of the solar module when it is fully illuminated by a sufficient optical source. Under a constant optical illumination, parallel configuring of N individual cells (FIG. 4) allows for producing constant voltage at N times the individual current capacity of each module. Alternatively, a serial connection of N solar cells (FIG. 5) allows for producing N times the voltage at the rated current of an individual solar cell. Accordingly, the electrical power generation capability of a solar array is directly proportional to the illuminated optical power density and the total array surface area. By arranging the individual cells in solar arrays, one can achieve a desired voltage and current to be delivered by the invention through the medium, as depicted generally in FIGS. 4, 5 and 6. A detailed discussion of a process to calculate the exact number of solar cells and diodes is also presented later in this document. Alternatively, one may further include a DC-DC power converter to convert the regulated output of the solar cell array to any desired voltage and current needed for output.

Figure 6:
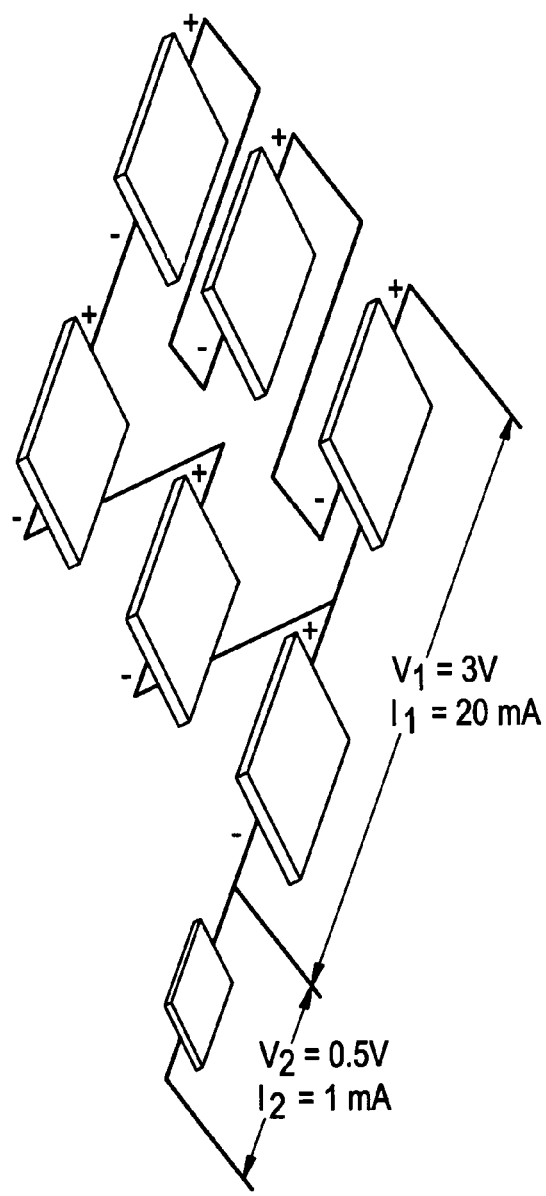
FIG. 6 is a schematic diagram of alternative exemplary circuitry for a dual voltage array that may be configured within the present invention.

Although the figures herein depict a scenario where individual solar cells are of uniform size and surface area, it will be understood that the invention need not be limited in this regard, as different solar cell sizes can be used to precisely engineer an exact voltage and current deliver mechanism. Additionally, one embodiment provides for the use of a solar cell arrangement to produce multiple polarity voltages, an exemplary illustration of which is depicted in FIG. 6.

The type or composition of solar cells may thus be modified within the scope of the invention, depending on the needs of the user and the end application. By way of one further possible embodiment, single crystal silicon solar cells offer moderate efficiencies for low to medium optical illumination density at a lower cost. Moreover, mono crystalline cells are easy to manufacture and cut, and readily available at affordable prices. Silicon solar cells are designed for solar power generation with direct sun illumination and therefore can only handle typical optical power densities not exceeding 1-sun (100 mW/cm$^2$). However, because the power conversion efficiency is also a function of wavelength of the optical source, silicon solar cells actually offer the highest efficiency in the IR wavelengths. Accordingly, in the exemplary scenario described above for the use of IR LED optical sources, it would then be optimal to choose a silicon solar cell array as described.

In alternative embodiments, usage of other suitable solar cell arrays might be contemplated. Where the particular application requires optimal performance despite a higher cost, it is possible to construct the solar cell array within more efficient single crystal silicon solar cells that can reach levels over 20% efficiency. The newest generation of such cells such as those offered by Sunpower Corp of Sunnyvale, Calif. offer the additional benefit of having a high closed circuit current capability. With the same surface area as conventional solar cells, these new solar cells can handle much higher optical power densities and generate much more current. These cells are designed for solar power generation with use of concentrating lenses for high intensity illumination and therefore can handle optical power density approaching 30 suns (3000 mW/cm$^2$). A detailed discussion of a process to calculate the exact number of solar cells elements and their arrangement is also presented later in this document.

In particular, it is possible to increase optical to electrical conversion efficiencies of solar cells by using other semiconductor materials, such as Gallium Arsenide (GaAs). Although GaAs-based solar cells are expensive, the use of a solar array made of GaAs solar cells and an IR LED array also based on GaAs LEDs offers a very high efficiency power transfer for another embodiment within the scope of the present invention.

Regardless of the type of solar cell and optical source chosen, the voltage and current will be produced by the photovoltaic effect at the solar cell array 6, for normalization by voltage regulator 12. Once regulated, the electrical conversion module 6 has completely converted the optical output received to an electrical output in the form of a DC power output for transmission along second transmission line 13 to the second circuitry (not depicted). Such circuitry might optionally include an additional DC-DC converter to convert the regulated output voltage to any desired voltage required. In all of the above embodiments, where one varies the optical source and/or the type of solar cell array, the resulting current may be easily controlled without the addition of any further components. Of course, the relative efficiencies described above may be taken into account, given the circuit needs of either side of the substantially transparent medium 5. By way of one specific example of an application of the inventive interface, a conventional GPS receiver used on board of a vehicle (car, truck, bus, aircraft, watercraft, etc.) navigation system requires an active antenna (typically a combination of a receive antenna, low noise amplifier and filter). The active antenna assembly typically requires a voltage between 2–5V at a current of 10–20 mA. In a typical application, the user has to place the active antenna outside the vehicle for the antenna to have full visibility of the GPS satellites. The power to the active antenna is provided through the coaxial cable that connects to the antenna, and this cable through cumbersome routing, must be brought from the outside of the vehicle to the interior where the GPS receiver resides. The electrical power transmission according to the invention would meet the power requirements of the active GPS antenna assembly. In such a case, the required DC power would be delivered through voltage regulator 12, which can provide a regulated 5 VDC output (or any other required voltage), and the requested GPS signals through optional radio frequency (RF) pads described hereafter.

Regardless of the particular application, the exemplary parameters may be shown for determining the specifics pertaining to the size and numbers of solar cells in an array, and the power derived therefrom. For example, in a typical application where DC power transfer through a transparent medium can be achieved by the use of the invention, it is necessary to design the type, size and configuration of the electronics components necessary to achieve a required power transfer. Furthermore, in such a typical application, a certain amount of power ($P_{out}$) is required at the second side of the substantially transparent medium. This power is typically consumed by electronic circuitry connected thereto (e.g., devices such as active antenna assemblies) that operate at a required voltage ($V_{out}$) and a load current ($I_{out}$) where $P_{out}=V_{out}*I_{out}$. To achieve power delivery of $P_{out}$, a solar cell configuration must be selected that can deliver $V_{out}$ and $I_{out}$. As described above, and generally depicted in FIGS. 4, 5, and 6, various parallel or series configurations of solar cells can be assembled to make this possible. On the first side of the substantially transparent medium, there must be enough optical power to illuminate the solar cells with sufficient intensity so that the power received at the second side can support the requirements of the particular electronic circuitry associated therewith. The relationship between the input power to the device ($P_{in}$) and $P_{out}$ may be described as:

$$P_{out}=\eta_{solar}*\eta_{optical}*\eta_{medium}*P_{in} \text{ where:}$$

$\eta_{solar}$=Optical to electrical conversion efficiency of the solar array $\eta_{optical}$=Electrical to Optical conversion efficiency of the optical array (e.g., LEDs)

$\eta_{medium}$=Optical transmission efficiency factor for the medium (1=no transmission loss)

Given the required $P_{out}$ and the efficiencies of the components involved, one can then calculate the required $P_{in}$. One can follow the same approach to size the optical source as well. If $P_{in}$ is known, the total optical power required is $P_{optical}=P_{in}*\eta_{optical}$. If a basic optical module (e.g., a discrete LED) has an optical intensity of $P_o$, then the number of optical modules (e.g., discrete LEDs) necessary is $P_{in}/P_{optical}$ rounded up to the nearest integer.

As an example for one application of the inventive interface, assume then that the power transfer requirements are $V_{out}=3V$, $I_{out}=10$ mA which requires a $P_{out}$ of 30 mW.

If a 0.5×2.5 cm commercially available solar cell module is used for a smallest solar cell component (basic module), it can deliver 0.5V at 10 mA when properly illuminated and electrically loaded. Accordingly, one would use 6 of these basic modules in series to be able to make up the required 3V and 10 mA. This would equate to a surface area of 6 times the basic module or 7.5 square cm (approximately 1.1 sq inches). Thereafter, further assume:

$\eta_{solar}=15\%$ $\eta_{optical}=10\%$ for an IR LED $\eta_{medium}=90\%$

The $P_{in}$ would be calculated as 2.2 W and $P_{optical}$ as 0.22 W. Using a typical, commercially available IR diode with say, 5 mW of optical radiated power, a minimum of 44 diodes would then be necessary to illuminate the solar cell array. Therefore, for the given application in question, the diodes would be arranged to uniformly illuminate 1.1 square inches of the solar cell array.

Figure 8:
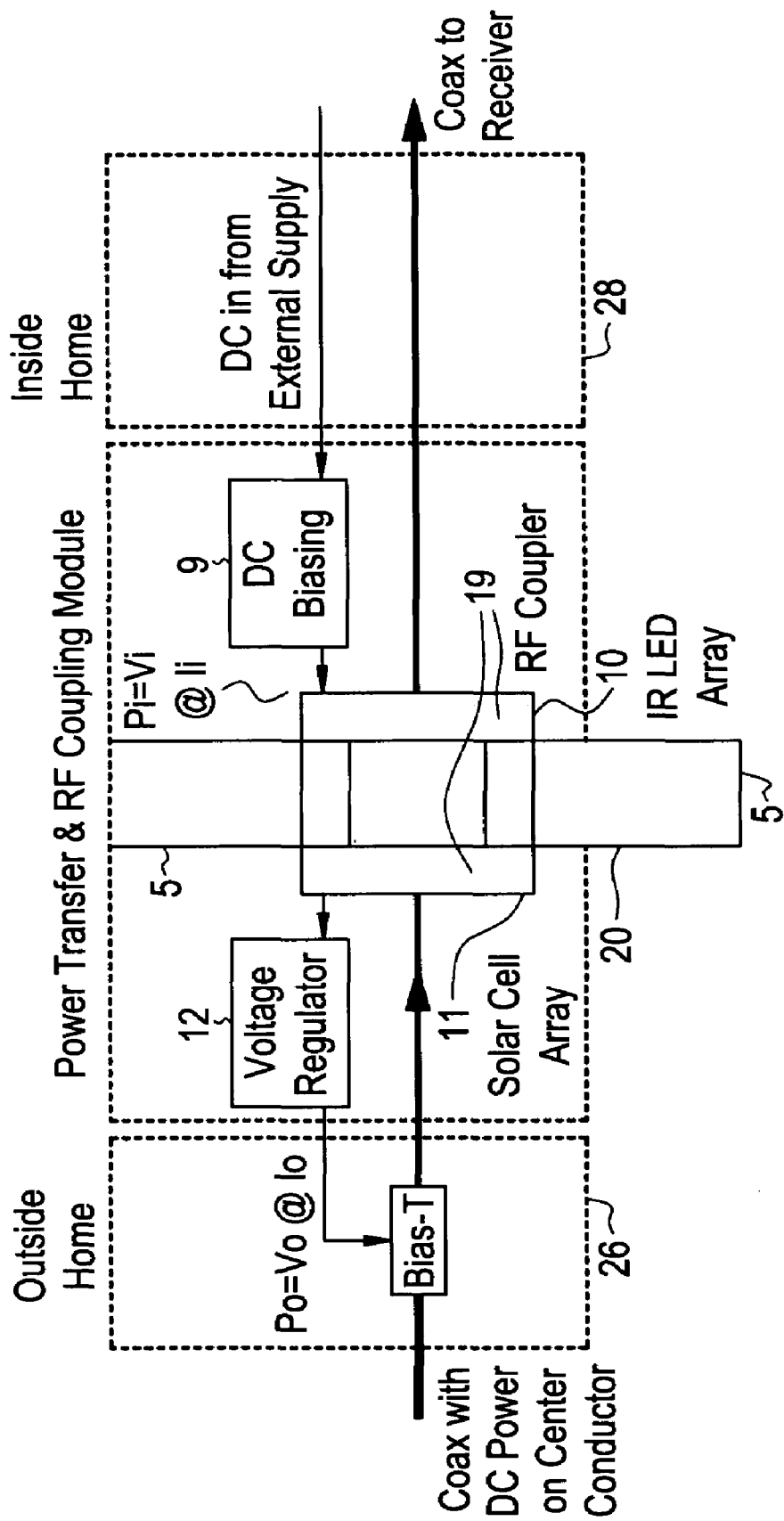
FIG. 8 is a block diagram of an exemplary application of the interface in a satellite TV system.
Figure 9:
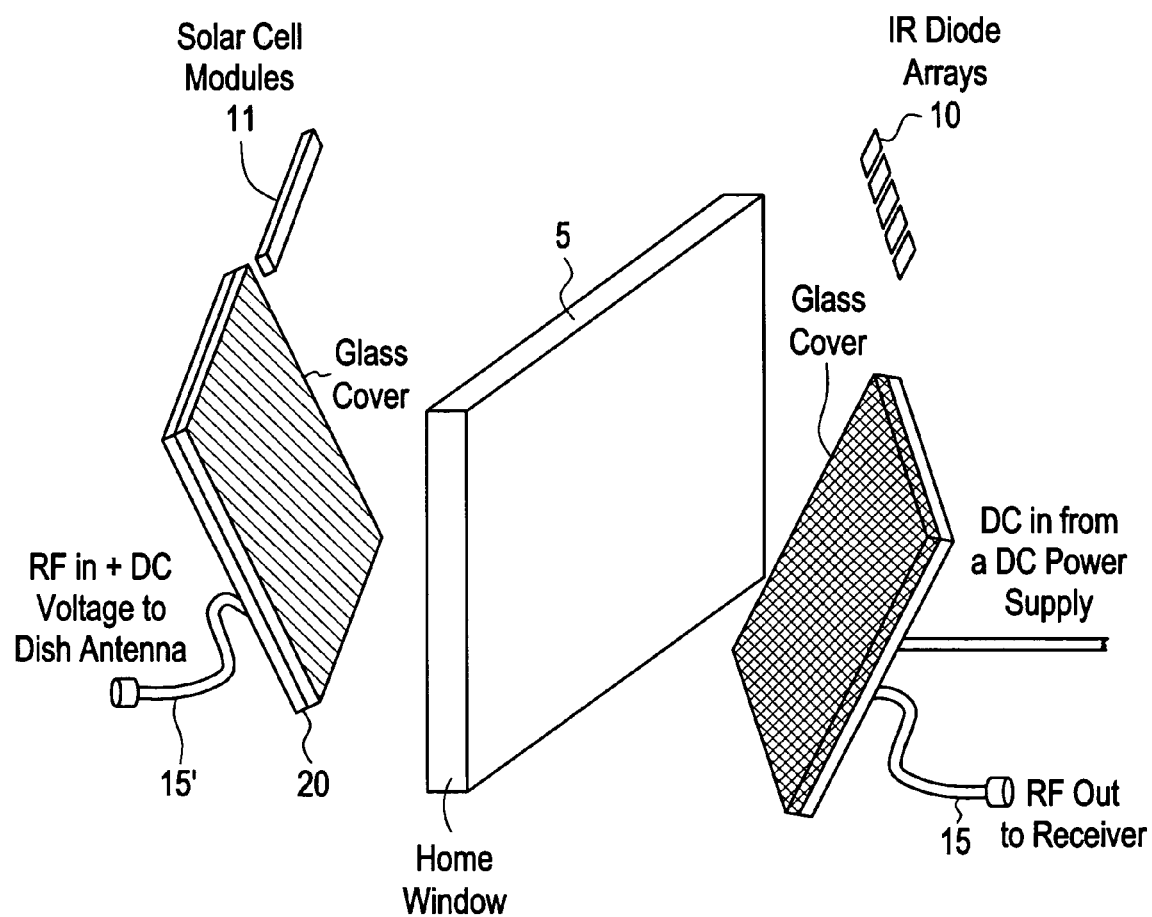
FIG. 9 is a 3-D view of an active through glass complex of an exemplary satellite TV application.

As mentioned above, RF signal transmission may optionally be provided for as a supplemental embodiment in the present invention. Such transmission would be in association with (e.g., located functionally proximate to) the above described conversion modules, and would ideally be provided for through the use of RF pads, such as those disclosed in U.S. Pat. Nos. 5,929,718; 6,686,882; 6,446,263; and 5,612,652 all of which are hereby incorporated by reference in their entirety. One embodiment is to incorporate such functionality because the inventive interface may be easily used in popular applications such as wireless communication applications, and satellite TV systems (see generally FIGS. 8 and 9), where it is necessary to place an integrated active antenna assembly (typically consisting of such elements as antenna/dish, low noise amplifiers, mixers and filters) through windows outside vehicles or structures (homes, office buildings, etc.). In other applications of the inventive interface one might be powering say, an antenna placement in permanent or portable GPS vehicle navigation systems, or a satellite receiver antenna for Satellite Digital Audio Radio Service (SDARS). In such cases, both DC power and RF signal transmission capability through glass must be available. Thus, the invention can be combined with an additional RF coupling device can accomplish this need, given that say, car windshields or home windows are substantially transparent media.

Figure 7:
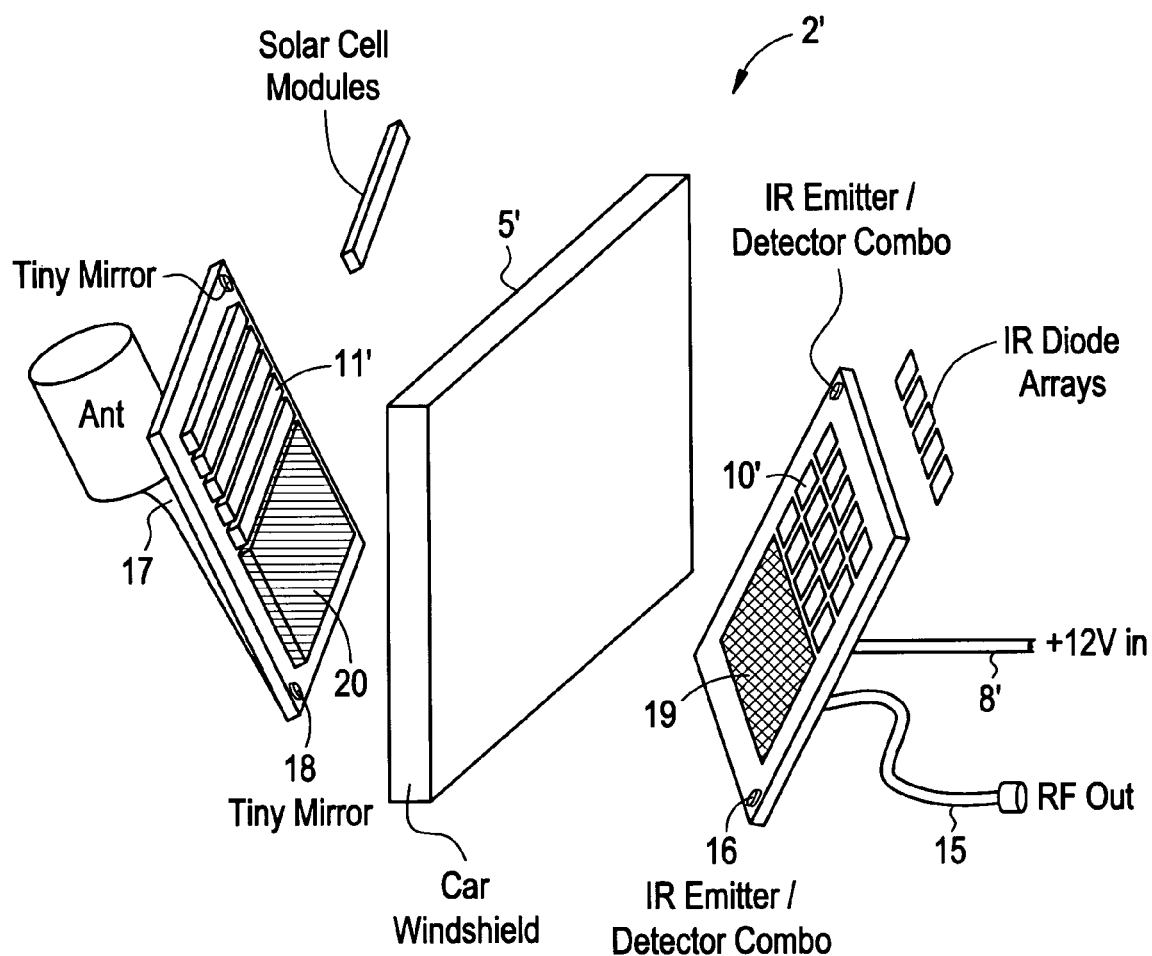
FIG. 7 is a 3-D view of an active through glass antenna (such as in a GPS system) with an alignment module for alignment feed back.

Accordingly, in such exemplary embodiments, the inventive interface might further include a substantially proximate set of substantially aligned, cooperative RF pads for bidirectionally transmitting RF signals between said first side of said substantially transparent medium, to said second side of said substantially transparent medium, as depicted in the exemplary embodiment in FIG. 7. RF signal transmission circuitry may include an antenna 17 connected to the second RF pad 20 to receive (and transmit) broadband RF signals therefrom and an RF feed line 15 connected to a first RF pad 19, for transmitting signals to and from the second RF pad 20 and the electronic circuitry at the first side of the substantially transparent medium (not depicted in FIG. 7, but typically is situated inside a car or home in the case of a GPS or SDARS or satellite TV system). Thus, the pairs of plates are arranged to conduct the RF signals across the substantially transparent medium.

As further depicted in FIG. 7, an optional alignment module comprising alignment circuitry may be provided for in substantial proximity to the RF plates 19, 20, and/or the optical source 10 (depicted as IR diode arrays 10' in FIG. 7) and to solar cell array 11 (depicted as solar cell modules 11' in FIG. 7). Such alignment circuitry might, in one exemplary embodiment, comprise at least one IR emitter/detector 6 on one side, and on the other side of the substantially transparent medium (depicted as a car windshield 5' in FIG. 7), at least one small mirror fixed in a location so as to be in axial alignment from IR emitter/detector 16 when there is substantial alignment between opposing RF pads 19, 20 and/or optical source 10 and solar cell array 11. This provides that when opposing RF pads 19, 20 and/or optical source 10 and solar cell array 11 are mounted on the surface of the substantially transparent medium 5, 5', across from each other on their respective (inside/outside) sides of the substantially transparent medium 5, 5', that they will be in substantial axial alignment so that any light or signal transmission (whether IR, or in other forms) can be efficiently and more fully transmitting and receiving the respective DC and/or RF energies. The feedback mechanism is also used by the electrical to optical module 4 containing optical source 10 to detect the substantially aligned presence of the optical to electrical module 6 containing the solar cell array 11. In a scenario where, say one module accidentally falls off, the electrical to optical module 4 containing the optical source 10 would immediately shut down (would permit no light or IR transmission from optical source 10) and a visual and audio alarm would bring it to the attention of the user. In addition to the safety benefits therein, the feedback mechanism of the alignment module also eliminates the necessity that the antenna installation be performed by trained professionals who can perform the accurate alignment. With the added feedback alignment, any antenna system using the inventive interface could even be installed using non-permanent glass mounts such as suction cups thereby eliminating the absolute necessity of utilizing permanent adhesions like seen in prior art alignments. Such a feature would be highly desirable in applications such as portable GPS navigation systems, where a portable GPS can now be used with a reusable through glass active antenna that uses the inventive process with alignment and a non-permanent mounting method. In alternate embodiments where a permanent mounting method for the inventive interface is used, caution must be taken that the bonding surfaces are coated with substantially transparent bonding agents as not to interfere with the transparency of the medium. Alternatively, a non-transparent bonding agent can be applied to the perimeter of the power transfer apparatus to achieve the same results. It is further noted, that depending on the system requirements, surface constraints (such as automobile heating elements and the like) one may configure both the optical source 10 and solar array 6 in many different shapes and sizes, so as to customize installation according to need.

Figure 10:
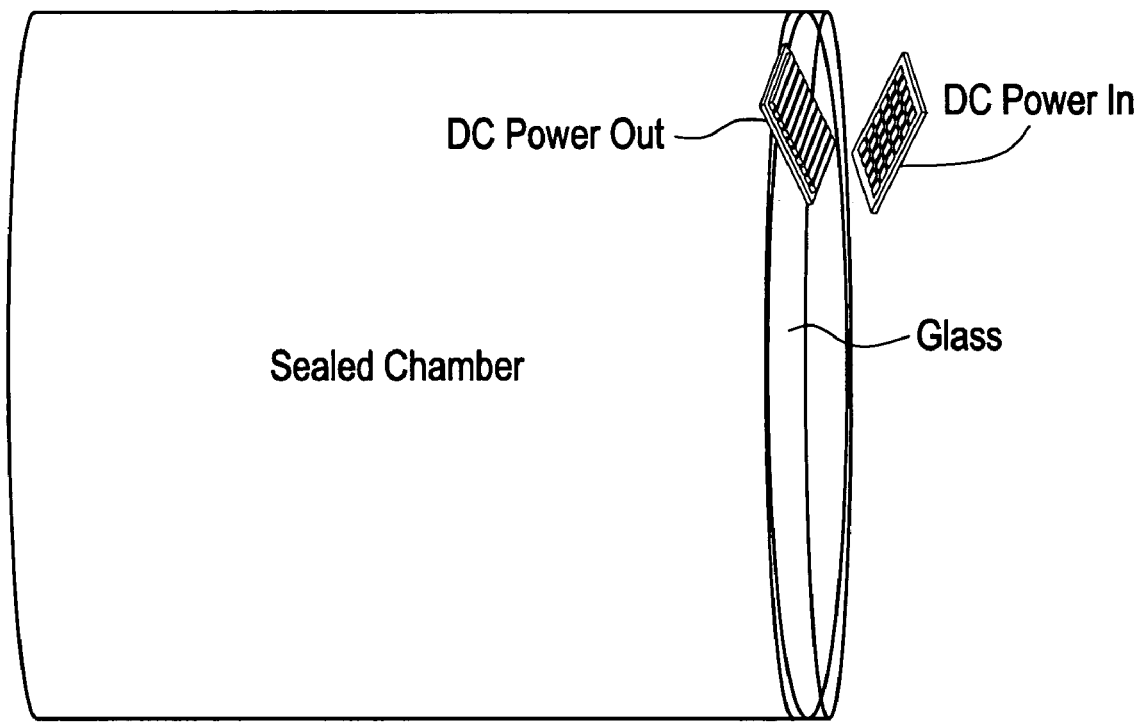
FIG. 10 is a 3-D view of an active through glass complex of an exemplary application of the interface on a sealed chamber.

By way of an alternative application utilizing the inventive interface, those skilled in the art will appreciate that in many physics or chemistry applications, sealed chambers (either vacuumed or highly pressurized), are used for performing experiments which may require DC power inside such chambers. However, delivery of power via wires can undermine the sealed integrity of the chamber(s). Accordingly, the inventive interface may be utilized as described above, if mounted on the inside and outside surfaces of a substantially transparent medium, (such as on the surfaces a glass window that is utilized for human observation into a vacuum chamber), and as depicted generally in FIG. 10.

By way of a further application, the inventive interface may be utilized within a security system. As may be appreciated by those in the intrusion detection arts, installation of burglar, fire or other security systems (such as security cameras) may need to be installed on or outside panes of glass in order to detect breakage, motion, or other disturbances. Particularly with security cameras that monitor perimeters of modern office buildings that have large glass surfaces and no openings or access to the outside, the camera and the associated electronics may be mounted outside the glass surface by using the inventive interface to provide power and/or signal transmission. Much as described in the exemplary embodiments above, the inventive interface might be mounted on the inside and outside surfaces of glass in a structure (not depicted) that utilizes known security systems so that continuity of power and signal integrity may be provided for without undesirable drilling through windows, etc.

It is to be understood that the invention is not limited to the illustrations described and shown herein, which are deemed to be more illustrative of the best modes of carrying out the invention, and which are susceptible of modification of form, size, and arrangement of parts and details operation. These modifications are within the spirit and scope of the appended claims.

What is claimed is:

1. An electrical energy transfer interface circuit capable of transferring usable electrical energy for connection between a first transmission line that is connected to a first electronic circuit on a first side of a substantially transparent media and a second transmission line that is connected to a second electronic circuit on a second side of the substantially transparent media, comprising:
   an electrical to optical conversion module at said first side for converting a DC electrical input received from said first electronic circuit through said first transmission line, to an optical output, said electrical to optical conversion module having an optical source therein for transmitting said optical output across said substantially transparent media from said first side of said substantially transparent media;
   an optical to electrical conversion module at said second side for receiving said optical output, from said optical source of said electrical to optical conversion unit, and for converting said optical output received from said optical source to a DC electrical output, said optical to electrical conversion module having a receiving surface area for receiving said optical output from across said substantially transparent media;
   wherein said optical source is a light source selected from the group consisting of LEDs, LDs, lasers, infrared, or visible light sources;
   wherein said receiving surface area for receiving said optical output is a solar cell array in substantial alignment with said optical source, said solar cell array being selected from the group consisting of conventional silicon solar cell arrays, high efficiency solar cell arrays, and GaAs solar cell arrays;
   wherein said electrical input is DC power supplied thereto, and wherein said electrical to optical conversion module further includes a DC biasing circuit for converting the electrical input;
   wherein said optical to electrical conversion module further includes a voltage regulator for converting the optical output received into said electrical output; and further including a substantially proximate set of substantially aligned, cooperative RF pads for bidirectionally transmitting RF signals between said first side of said substantially transparent medium, to said second side of said substantially transparent medium.

2. The interface of claim 1, wherein said interface is attached with bonding agents to the inside and outside glass surfaces so as to form a sealed chamber.

3. A method for forming an electrical energy transfer interface circuit capable of transferring usable electrical energy for connection between a first transmission line that is connected to a first electronic circuit on a first side of a substantially transparent media and a second transmission line that is connected to a second electronic circuit on a second side of the substantially transparent media, comprising the steps of:
   connecting an electrical to optical conversion module to said first transmission line at said first side of said substantially transparent media, for converting a DC electrical input received from said first electronic circuit through said first transmission line, to an optical output, said electrical to optical conversion module being formed so as to have an optical source therein for transmitting said optical output across said substantially transparent media from said first side of said substantially transparent media;
   connecting an optical to electrical conversion module to said second transmission line at said second side of said substantially transparent media, for receiving said optical output, from said optical source of said electrical to optical conversion unit, and for converting said optical output received from said optical source to a DC electrical output, said optical to electrical conversion module being formed so as to have a receiving surface area for receiving said optical output from across said substantially transparent media;
   wherein said optical source is formed from a light source of a type selected from the group consisting of LEDs, LDS, lasers, infrared, or visible light sources;
   wherein said receiving surface area for receiving said optical output is formed from a solar cell array that is in substantial alignment with said optical source, said solar cell array being a type formed from the group consisting of conventional silicon solar cell arrays, high efficiency solar cell arrays, and GaAs solar cell arrays;
   wherein said electrical input is DC power supplied thereto, and wherein the forming of said electrical to optical conversion module further includes installation of a DC biasing circuit for converting the electrical input;
   wherein the forming said optical to electrical conversion module further includes installation of a voltage regulator for converting the optical output received into said electrical output; and
   wherein the forming of said interface further including installing a substantially proximate set of substantially aligned, cooperative RF pads for bidirectionally transmitting RF signals between said first side of said substantially transparent medium, to said second side of said substantially transparent medium.

* * * * *